United States Patent [19]

Bormioli

[11] 4,426,063

[45] Jan. 17, 1984

[54] TERMINAL PIPE FITTING PROVIDED WITH A SELF-LOCKING DEVICE FOR THE RELEASABLE COUPLING TO A FLANGED MOUTH, PARTICULARY FOR THE LOADING OF A FLUID OIL PRODUCT INTO A LORRY TANK

[76] Inventor: Giorgio Bormioli, Via Galileo Galilei, 11, 35100 Padova, Italy

[21] Appl. No.: 318,032

[22] Filed: Nov. 4, 1981

[30] Foreign Application Priority Data

Dec. 23, 1980 [IT] Italy ............................... 26895 A/80

[51] Int. Cl.³ ............................................. F16L 37/28
[52] U.S. Cl. ................................ 251/149.9; 251/89.5; 285/85; 137/614.06
[58] Field of Search ......................... 285/85, 315, 316; 251/149.9, 89.5; 137/614.06

[56] References Cited

U.S. PATENT DOCUMENTS

| | | | |
|---|---|---|---|
| 3,168,125 | 2/1965 | Rosell | 137/614.06 |
| 3,295,553 | 1/1967 | Garrett et al. | 137/614.06 |
| 3,479,005 | 11/1969 | De Graaf | 285/85 |
| 3,884,448 | 5/1975 | Millar et al. | 251/149.9 |
| 4,030,524 | 6/1977 | McMath et al. | 137/614.06 |

Primary Examiner—A. Michael Chambers
Attorney, Agent, or Firm—Shlesinger, Fitzsimmons & Shlesinger

[57] ABSTRACT

The pipe fitting includes a movable seat equipped with an appendix enagageable from its front side by the mouth during the approach of the pipe fitting to the mouth. As a result of such engagement, the movable seat moves to a latching position to put itself on a flange portion of the mouth and to keep the latter in close contact with the end of the pipe fitting. In the meantime the movable seat releases an elastically stressed bar which in its turn unlocks a check-valve in the fitting, allowing to open. Once it is free, the bar keeps moreover the movable seat in its latched position.

3 Claims, 4 Drawing Figures

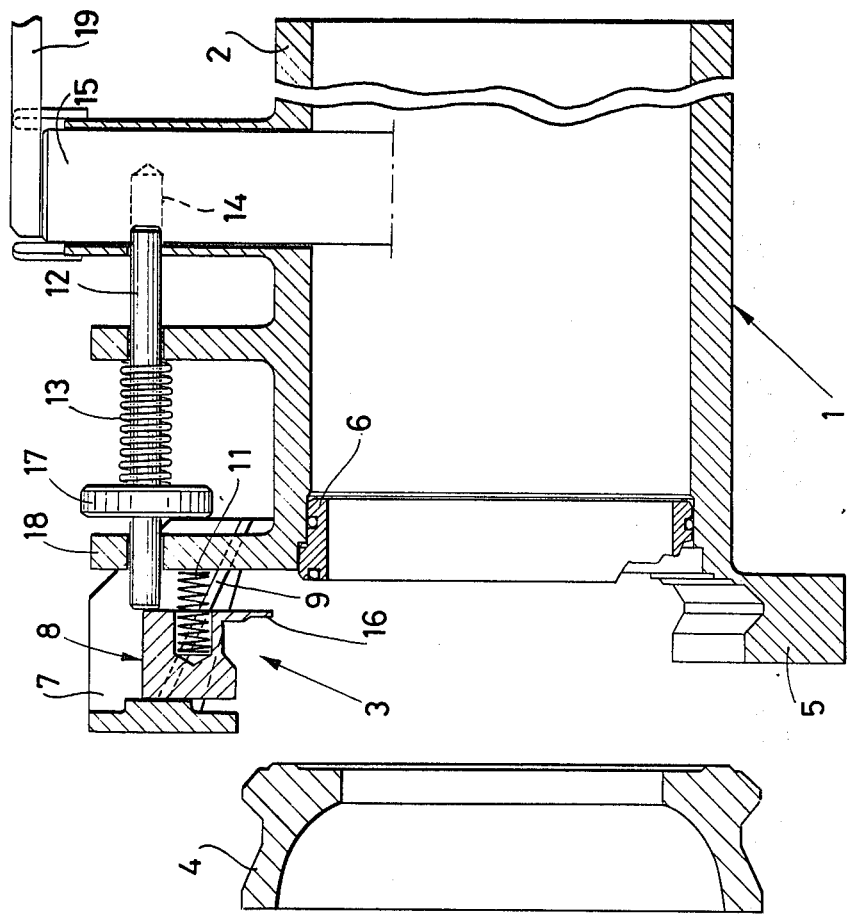
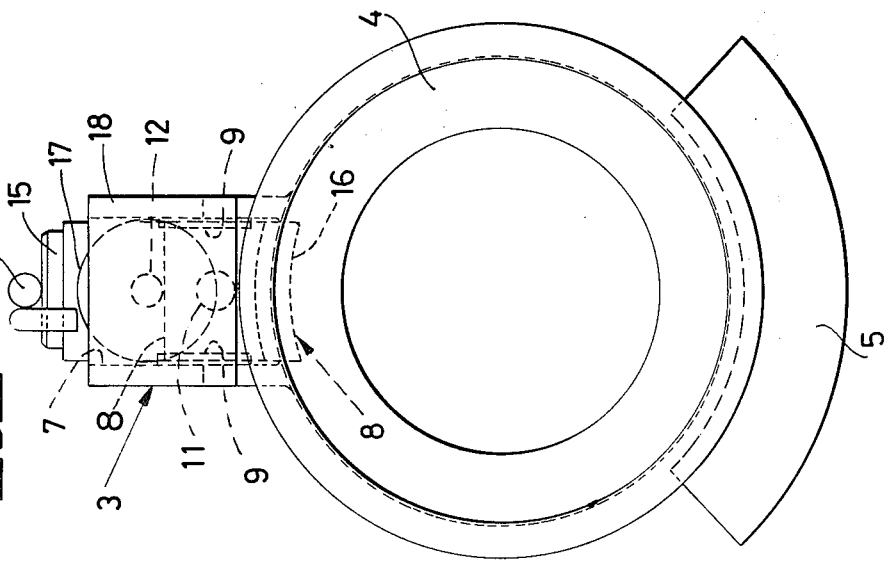

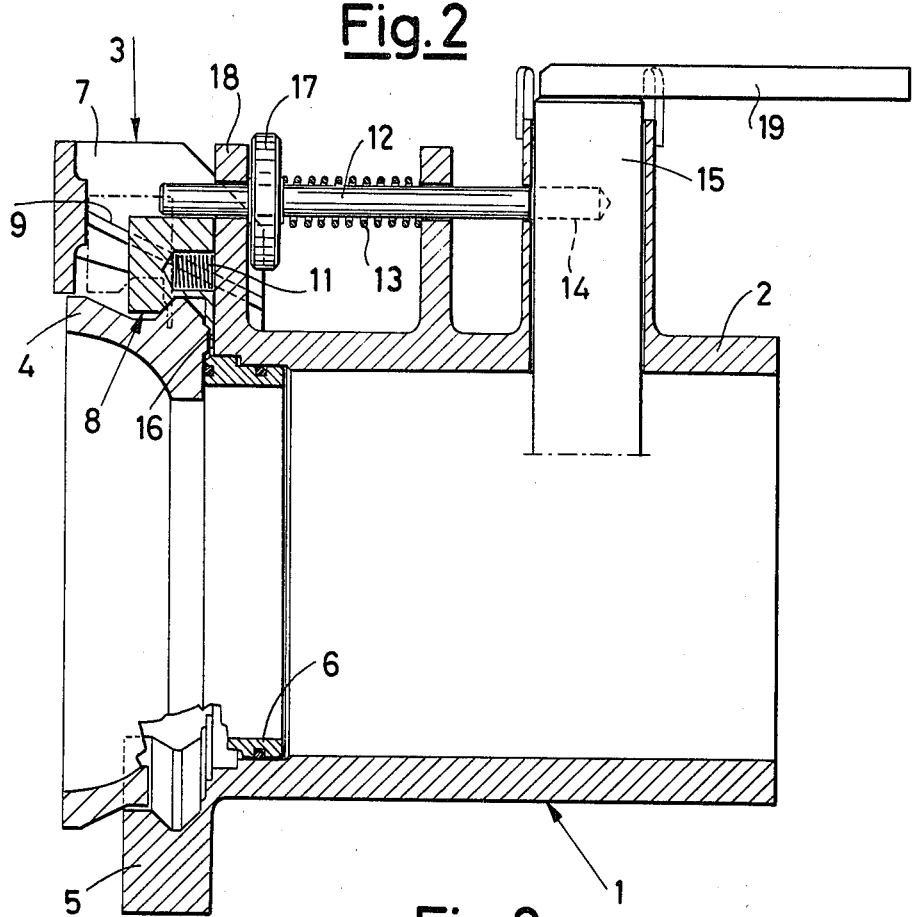
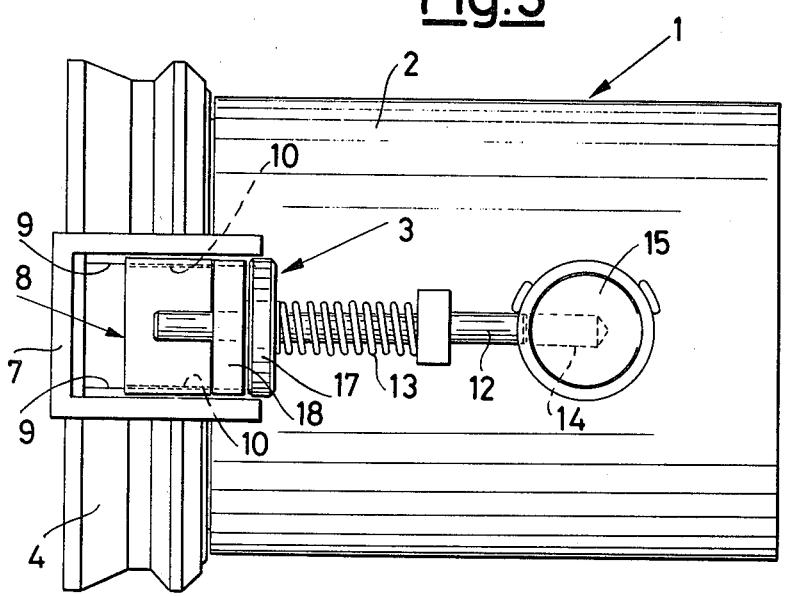

TERMINAL PIPE FITTING PROVIDED WITH A SELF-LOCKING DEVICE FOR THE RELEASABLE COUPLING TO A FLANGED MOUTH, PARTICULARY FOR THE LOADING OF A FLUID OIL PRODUCT INTO A LORRY TANK

The present invention relates to a terminal pipe fitting, which is provided with a self-locking device for the releasable coupling the fitting to a flanged mouth, particularly for the loading of a fluid oil product into a lorry tank.

It is known that lorries destined to the transport of fluid oil products have their tank provided with suitable flanged mouths, to which, in the loading stage, the end of a product feed pipe is approached and locked. Such pipe is usually equipped with a terminal pipe fitting provided with a check valve for opening and closing the pipe and with means of various kind for carrying out the releasable coupling to the tank mouth.

The object of the present invention is to realize a terminal pipe fitting wherein a structurally and functionally very simple device is able to carry out automatically the coupling of the pipe fitting to a flanged mouth and the release of the check-valve from a state of locking in the closing position, as a direct consequence of the approaching of the pipe fitting to the flanged mouth.

According to the invention this object is reached by a pipe fitting, comprising a tubular body open at the ends, a check-valve located in said tubular body and provided with a drive shaft protruding therefrom, and a device for coupling a flanged mouth, which device is associated to one end of said tubular body, characterized in that said device comprises at least one movable seat for a flange portion of said mouth, said movable seat being resiliently or elastically stressed towards a rest position in which it is longitudinally removed from said end of the pipe fitting and displaced outwards with respect thereto and having a radial appendix engageable by the front side of the mouth for the displacement of said movable seat along an oblique guide towards a work position in which said movable seat is engaged on said flange portion of the mouth and keeps the latter in close contact with said end of said tubular body, there being provided a movable member which is displaceable to a first position in which a part thereof if partly inserted in a radial cavity of the drive shaft of the check valve to lock the latter in closing position, but is elastically stressed towards a second position in which said part of the movable member is completely outside said cavity to allow the displacement of the check-valve to the opening position, said member and said movable seat cooperating with one another so that, with said movable seat in rest position, said member is kept by said movable seat in said first position and, with said movable seat in work position, said member is left free to move to said second position, in which it keeps in its turn said movable seat in said work position.

In other words, the pipe fitting according to the invention provides that at least one movable seat adapted for receiving a corresponding flange portion of the mouth is normally kept in a position longitudinally and transversally removed from the end of the pipe fitting and in such position keeps in its turn a cooperating movable member in such a position as to cause the locking of the check valve in closing position. Bringing the mouth near the end of the pipe fitting, there is realized between the mouth and an appendix of the movable seat such as engagement as to cause automatically the displacement of the movable seat to a position adapted for the locking of the mouth against the end of the pipe fitting. Such a displacement releases the movable member, which springs in its turn to a such a position as to allow the opening of the check-valve and to keep in the meantime the movable seat in the just reached position. In a simple and completely automatic way, and without the use of power members and relative controls, it is thus obtained the coupling of the pipe fitting with the flanged mouth and, in the same time, unlocking of the check-valve from the closing position.

The features of the present invention will be made more evident by the following detailed descrption of an embodiment thereof, which is illustrated by way of example in the enclosed drawings, in which:

FIG. 1 shows a pipe fitting according to the invention in longitudinal section, before the coupling to a flanged mouth;

FIG. 2 shows said pipe fitting still in longitudinal section, with accomplished coupling;

FIG. 3 shows said pipe fitting in top plan view with respect to FIG. 2;

FIG. 4 shows said pipe fitting in front view from left with respect to FIG. 2.

With reference to the drawings there is shown a terminal pipe fitting 1, which includes a cylindrical tubular body 2 open to both ends, one of which (the right one looking at FIGS. 1 and 2) is destined to be properly fixed to a hose or pipe, particularly for the feeding of fluid oil products.

The other end of the tubular body 2 is, in its turn, provided with a device 3 capable of realizing the releasable coupling of the pipe fitting 1, and consequently of the pipe to which it is fixed, to a flanged nozzle or mouth 4, particularly of the type forming part of a lorry or tank truck destined to the transport of fluid oil products.

Said device comprises a fixed, arcuate seat 5 for receiving a portion of the annular flange of the mouth 4 to help keep it in position against a movable seal 6 carried by the tubular body 2, and an opposed, movable seat 8 adapted, in its turn, for receiving a corresponding diametrally opposed portion of the annular flange of the mouth.

The movable seat 8 is substained on fitting 1 by a fixed box-like support 7, in which it can move between the rest position of FIG. 1 and the work or latching position of FIGS. 2–4 as a result of the sliding engagement existing between two oblique inner tabs or tongues 9 which project from opposite sides of the box-like support 7 into corresponding oblique lateral grooves 10 (FIG. 3) of the movable seat.

A spring 11 elastically stresses the movable seat 8 to the rest position, wherein said movable seat is longitudinally removed and transversally displaced outwards with respect to the adjacent end of the tubular body 2 (FIG. 1). In such a position the movable seat 8 axially holds one end of a sliding bar 12 in a retracted position against the action of a spring 13, so that the opposite end (the right one looking at FIG. 1) of the bar is partially inserted in a radial cavity 14 formed in the periphery of a rotating shaft or valve stem 15 destined to control a check valve located in the inside of the tubular body 2 (and not shown in the drawings because completely usual and without any importance to the purposes of the present invention). With the bar 12 engaged in the cavity 14, the shaft 15 is locked in the angular position in which the check valve is closed.

From its rest position of FIG. 1 the movable seat 8 is displaceable upon engagement of the front side of the mouth 4 with a radial appendix or projection 16 on the movable seat. For example, assuming that the lower portion of the mouth 4 has been inserted in the seat 5, then as the tubular body 2 is swung or otherwise moved toward the upper portion of the mouth 4, the movable seat 8 is thus obliged because of the engagement of the mouth 4 with the appendix 16, to move along an oblique guide formed by the tabs 9 of the box-like support 7, thus progressively approaching to the fixed seat 5 in both radial and longitudinal directions, until it snugly engages the upper flange portion of the mouth 4 and locks the same, in its turn, against the movable seal 6, in the desired sealtight coupling position.

Just at the end of such movement of the seat 8, the latter leaves the frontal engagement with the bar 12, which the spring 13 makes consequently spring up forward to the position shown in FIG. 2, defined by the abutment between a roller 17 mounted on the bar 12 and an external projection 18 of the tubular body 2. With the bar 12 in such position, its end previously inserted in the cavity 14 of the shaft 15 is completely outside the same cavity, so that the shaft 15 can be rotated (for instance by a lever 19) to open the associated check-valve; in the meantime the other end of the bar 12 is overlapping the movable seat 8 and prevents any unwished return of the latter its rest position, making steady the just realized coupling.

For the uncoupling it is clearly sufficient to operate on the roller 17 to bring back the bar 12 and thus to block again the valve in rest position and to allow the spring 11 to put again at rest the movable seat 8.

I claim:

1. Terminal pipe fitting, comprising a tubular body open at its ends, a check-valve located in said tubular body and provided with a drive shaft protruding therefrom, and a device for coupling the flanged mouth of a nozzle to one end of said tubular body, characterized in that said device comprises at least one movable seat on said body engagable with a first flange portion of said mouth, first resilient means urging said movable seat elastically towards a rest position in which it is axially and radially spaced from said one end of the pipe fitting, said seat having thereon a radial appendix engageable by the front side of said mouth during relative movement of said tubular body and pipe fitting one toward the other, thereby to effect the displacement of said movable seat along an oblique path towards a latching position in which said movable seat is engaged against said first flange portion of the mouth to keep the latter in close, sealing contact with said one end of said tubular body, a movable member on said body displaceable to a first position in which a part thereof is partially inserted in a radial cavity in said drive shaft of the check valve to lock the latter in closed position, and second resilient means elastically urging said member towards a second position in which said part of the movable member is completely outside said cavity to allow the displacement of the check-valve to its open position, said member and said movable seat cooperating with one another, so that, with said movable seat in its rest position, said member is kept by said movable seat in said first position and, with said movable seat in its latching position, said member is left free to be moved by said second resilient means to said second position, in which it keeps, in its turn, said movable seat in said latching position until said member is returned to its first position.

2. Terminal pipe fitting according to claim 1, characterized in that said device further comprises a fixed seat on said tubular body at a position diametrally opposite to said movable seat, and engagable with a second portion of said mouth diametrally opposite said first position thereof.

3. Terminal pipe fitting according to claim 1, characterized in that said movable member is constituted by an axially movable bar having a first end insertable in said cavity of the drive shaft and a second end cooperating with said movable seat.

* * * * *